(12) United States Patent  (10) Patent No.: US 9,100,229 B2
Jing et al.  (45) Date of Patent: Aug. 4, 2015

(54) METHOD OF CALIBRATING A SLICER IN A RECEIVER OR THE LIKE

(71) Applicant: LSI Corporation, San Jose, CA (US)

(72) Inventors: Tai Jing, Los Altos, CA (US); Hairong Gao, Sunnyvale, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 8 days.

(21) Appl. No.: 14/036,493

(22) Filed: Sep. 25, 2013

(65) Prior Publication Data

US 2015/0085957 A1 Mar. 26, 2015

(51) Int. Cl.
*H04L 25/06* (2006.01)
*H04L 25/03* (2006.01)

(52) U.S. Cl.
CPC . *H04L 25/03057* (2013.01); *H04L 2025/03789* (2013.01)

(58) Field of Classification Search
USPC .................................................. 375/229–233
See application file for complete search history.

(56) References Cited

U.S. PATENT DOCUMENTS

| | | | |
|---|---|---|---|
| 5,761,251 A | 6/1998 | Wender | |
| 7,065,026 B2 | 6/2006 | Hung et al. | |
| 7,792,185 B2 | 9/2010 | Bulzacchelli et al. | |
| 8,126,045 B2 | 2/2012 | Bulzacchelli et al. | |
| 8,249,207 B1 | 8/2012 | Hissen et al. | |
| 8,401,064 B1 * | 3/2013 | Lin et al. | ......................... 375/233 |
| 2008/0285639 A1 | 11/2008 | Chen et al. | |
| 2013/0064281 A1 * | 3/2013 | Raphaeli et al. | .............. 375/233 |
| 2013/0141263 A1 | 6/2013 | Debnath et al. | |

OTHER PUBLICATIONS

Leibowitz et al.; A 7.5Gb/s 10-Tap DFE Receiver with First Tap Partial Response, Spectrally Gated Adaptation, and 2nd-Order Data-Filtered CDR; ISSCC 2007 / Session 12 / Gigabit CDRs and Equalizers /124; 2007 IEEE International Solid-State Circuits Conference; Digest Oftechnical Papers.
Payne et al.; A 6.25-Gb/s Binary Transceiver in 0.13-μm CMOS for Serial Data Transmission Across High Loss Legacy Backplane Channels; IEEE Journal of Solid-State Circuits, vol. 40, No. 12, Dec. 2005; Manuscript received Apr. 7, 2005; revised Jul. 25, 2005; Texas Instruments Incorporated, Dallas, TX 75243 USA.

(Continued)

*Primary Examiner* — Dac Ha
*Assistant Examiner* — Janice Tieu
(74) *Attorney, Agent, or Firm* — Sheridan Ross P.C.

(57) ABSTRACT

A method of calibrating data slicer-latches in a receiver to remove offset errors in the slicer-latches. A known voltage is applied to all but one of the inputs of the slicer-latch. The remaining input receives an offset cancelation voltage from a DAC is stepped upward from a minimum voltage until the slicer-latch output transitions by incrementing a codeword to the DAC and the codeword that resulted the transition is saved. Then the offset cancelation voltage is swept downward in steps from a maximum voltage until the slicer-latch output transitions and the codeword that caused the transition is averaged with the stored codeword. The average of the codewords is applied to the DAC to generate the offset cancelation voltage used during normal operation of the receiver.

22 Claims, 5 Drawing Sheets

(56) References Cited

OTHER PUBLICATIONS

Gangasani et al.; A 16-Gb/s Backplane Transceiver with 12-Tap Current Integrating DFE and Dynamic Adaptation of Voltage Offset and Timing Drifts in 45-nm SOI CMOS Technology; 978-1-4577-0223-5/11/$26.00 © 2011 IEEE; IBM Systems and Technology Group, Hopewell Junction, NY, USA and IBM T. J. Watson Research Center, Yorktown Heights, NY, USA.

Bulzacchelli et al.; A 10-Gb/s 5-Tap DFE/4-Tap FFE Transceiver in 90-nm CMOS Technology; IEEE Journal of Solid-State Circuits, vol. 41, No. 12, Dec. 2006; Manuscript received Jun. 10, 2006; revised Aug. 23, 2006; IBM Research Division, T. J. Watson Research Center, Yorktown Heights, NY 10598 USA.

Beukema et al.; A 6.4-Gb/s CMOS SerDes Core With Feed-Forward and Decision-Feedback Equalization; IEEE Journal of Solid-State Circuits, vol. 40, No. 12, Dec. 2005; Manuscript received Apr. 12, 2005; revised Jul. 25, 2005; IBM T. J.Watson Research Center, Yorktown Heights, NY 10598 USA; IBM Microelectronics, East Fishkill, NY 12533 USA; IBM U.K., Hursley, Winchester SO21 2JN U.K.

Kasturia,Sanjay and Winters, Jack H.; Techniques for High-speed Implementation of Nonlinear Cancellation; IEEE Journal on Selected Areas in Communications. vol. 9. No. 5. Jun. 1991; Manuscript received May 30, 1990; revised Mar. 14, 1991; Network Systems Research Department, AT&T Bell Laboratories. Holnidel, NJ 07733.

Bulzacchelli et al.; a 78mW 11.1Gb/s 5-Tap DFE Receiver with Digitally Calibrated Current-Integrating Summers in 65nm CMOS; ISSCC 2009 / Session 21 / 10Gb/s-TO-40Gb/s Transmitters and Receivers/ 21.6; 2009 IEEE International Solid-State Circuits Conference; IBM T. J. Watson Research Center, Yorktown Heights, NY.

* cited by examiner

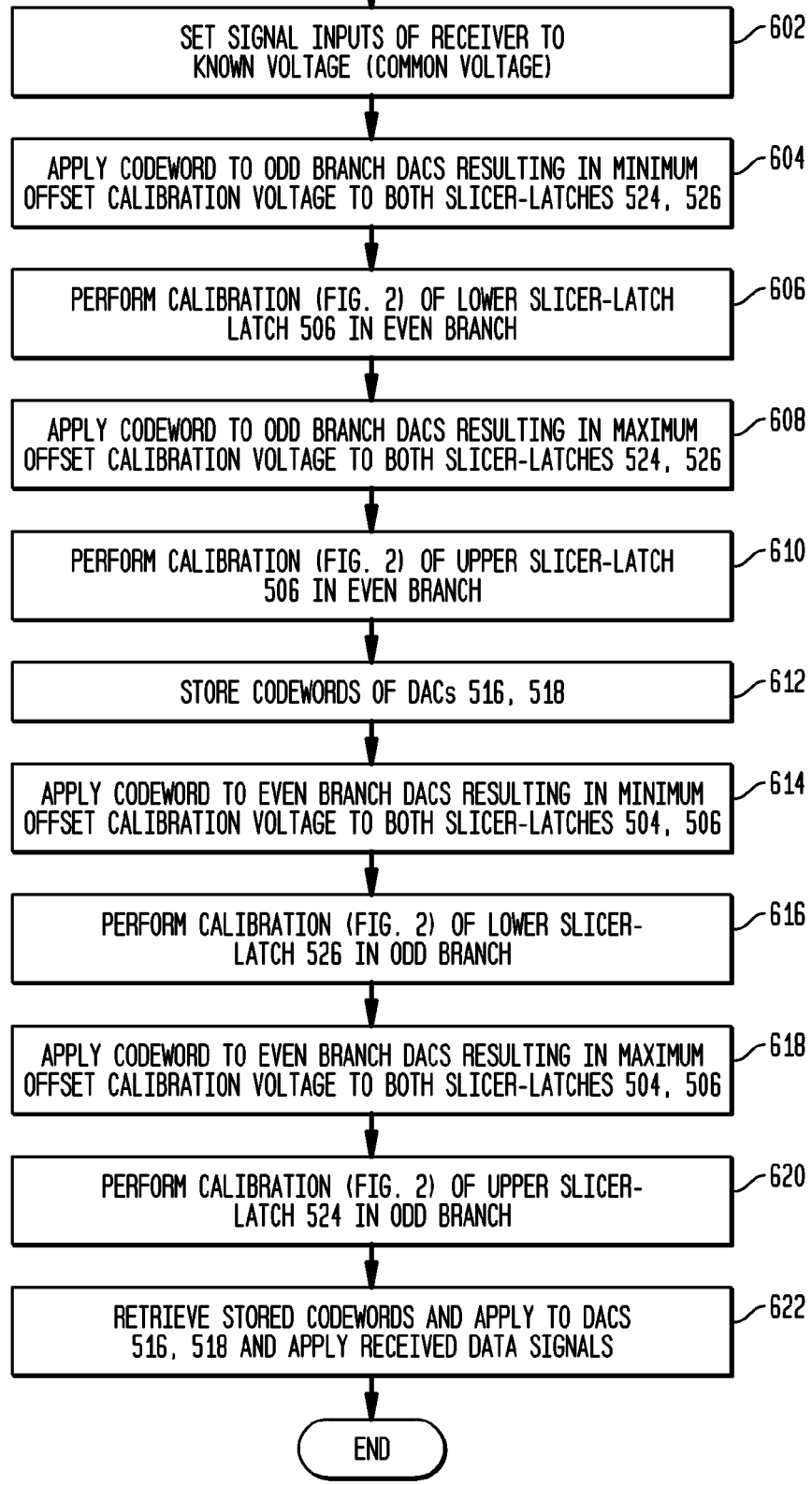

METHOD OF CALIBRATING A SLICER IN A RECEIVER OR THE LIKE

BACKGROUND

1. Field of the Invention

The present invention relates to receivers generally and, more specifically, to calibration of the slicers in the receiver to remove offset errors therein.

2. Description of the Related Art

Communication receivers that recover digital signals must sample an analog waveform and then reliably detect the sampled data. Signals arriving at a receiver are typically corrupted by intersymbol interference (ISI), crosstalk, echo, and other noise. As data rates increase, the receiver must both equalize the channel, to compensate for such corruptions, and detect the encoded signals at increasingly higher clock rates. Decision-feedback equalization (DFE) is a widely used technique for removing intersymbol interference and other noise at high data rates.

Generally, decision-feedback equalization utilizes a non-linear equalizer to equalize the channel using a feedback loop based on previously detected (or decided) data. In one typical DFE-based receiver implementation, a received analog signal is sliced to generate digital data for further processing. In some high-speed (multi-gigabit) applications, so called "double-rate" receivers with an unrolled digital DFE might be used. However, these receivers are sensitive to offset-induced slicing errors where the slicing threshold determines whether received signal is a one or a zero. Because of circuit imperfections, the slicing threshold may be off by tens of millivolts from a desired value, e.g., zero volts. Because the amplitude of the received signals is around one hundred millivolts, an offset-induced slicing voltage error of tens of millivolts is a relatively large percentage of the signal amplitude and can seriously degrade performance of the overall receiver. It is desirable to quickly and accurately calibrate the slicers to remove or compensate for the offset voltage of the slicer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment of the invention, a method is described for reducing offset errors in a data slicer having at least two analog inputs and a digital output. A fixed signal is applied to a first one of the data slicer inputs, the fixed signal having a known value. Then a calibration signal is applied to a second one of the data slicer inputs, the calibration signal having a first starting value. The value of the calibration signal is changed by an amount having a first polarity until the output of the data slicer changes state. Once the output changes state, the value of the calibration signal is stored as a first value. Then the value of the calibration signal is set to a second starting value different from the first starting value and the calibration signal value is changed by a second amount having a second polarity opposite the first polarity until the output of the data slicer changes state. Once the output changes state, the value of the calibration signal is averaged with stored value to form a calibration signal average value and the calibration signal average value is applied as the calibration signal to the data slicer input. Then the fixed signal from the data slicer input is removed and an input signal is applied to the data slicer input.

BRIEF DESCRIPTION OF THE DRAWINGS

Other embodiments of the present invention will become more fully apparent from the following detailed description, the appended claims, and the accompanying drawings in which like reference numerals identify similar or identical elements.

FIG. 6 is a flowchart of an exemplary process for calibrating the slicer-latches in the receiver of FIG. 5 and utilizing the exemplary process of FIG. 2.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation".

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to transfer between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise. Further, elements in a figure having subscripted reference numbers (e.g. $100_1, 100_2, \ldots 100_K$) might be collectively referred to herein using the reference number 100.

The present invention will be described herein in the context of illustrative embodiments of an offset voltage calibration or compensation circuit adapted for use in a serializer/deserializer or the like. It is to be appreciated, however, that the invention is not limited to the specific apparatus and methods illustratively shown and described herein.

As data rates increase for serializer/deserializer (SERDES) applications, the channel quality degrades. Decision feedback equalization (DFE) in conjunction with an optional finite impulse response (FIR) filter in a transmitter (TX) and a receiver analog front-end equalizer within a receiver are generally used to achieve the bit error rate (BER) performance needed for reliable communications. It is understood that the FIR function of the transmitter can be moved from the transmitter to the receiver and incorporated into the receiver's analog front end.

Figure 1:
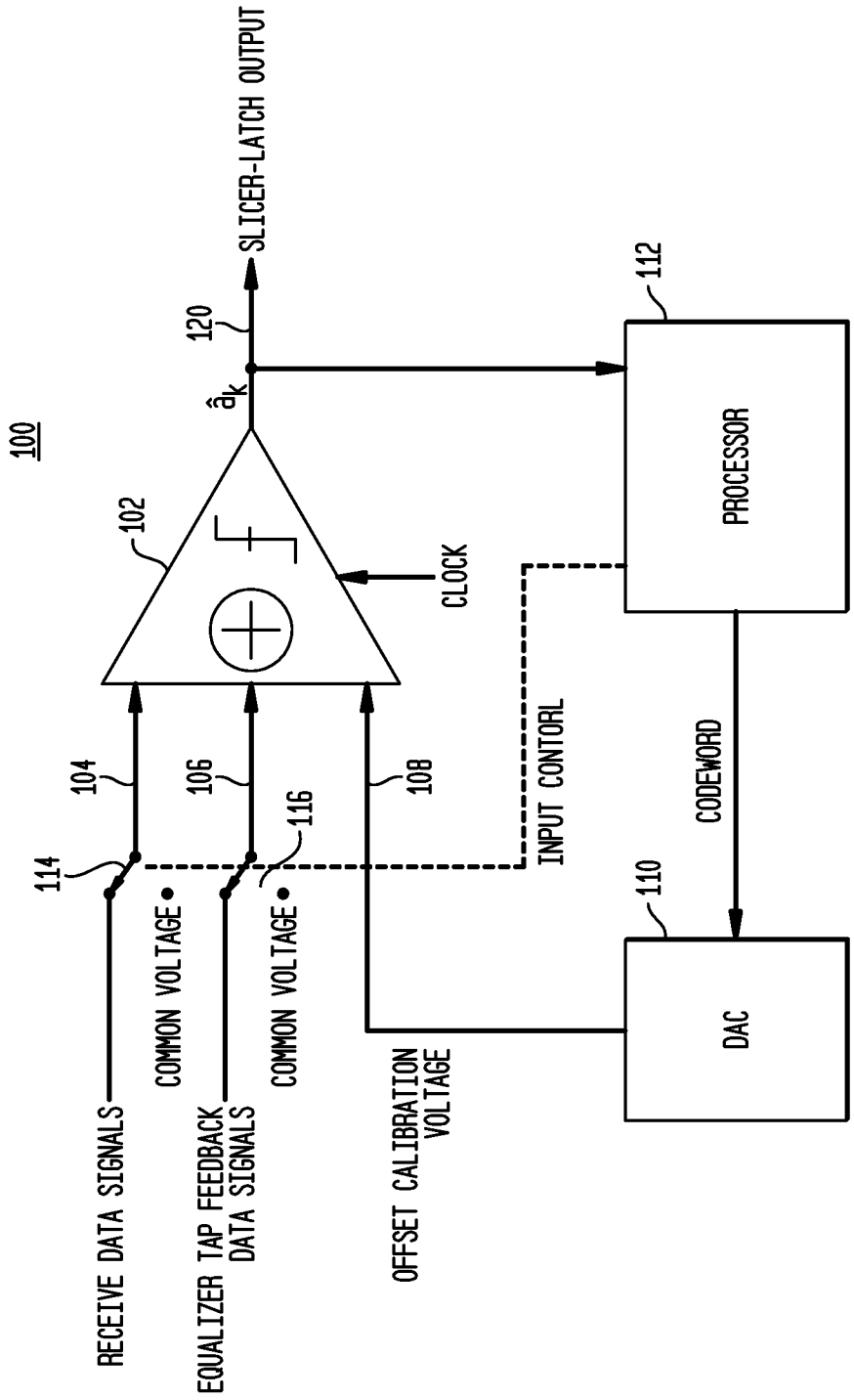
FIG. 1 is a simplified block diagram of a slicer-latch and calibration system.

FIG. 1 is a block diagram of an exemplary system 100 for calibrating a slicer-latch 102. Calibration in this application means compensating or canceling any offset voltage in the slicer-latch, i.e., adjusting the slicer-latch to change state at a desired input voltage as described in more detail below. The source of the offset voltage is well known and might occur due to manufacturing variations across the chip the slicer-latch is implemented in. Exemplary sources of offset in the slicer portion of the slicer-latch 102 are slight differences in input transistor sizes as formed in the chip, small current differences or temperatures in the input transistors, etc. Offset voltages in a typical slicer implemented in 90 nm or smaller geometry complementary-metal-oxide-silicon (CMOS) fabrication technology are generally less than 50 mV and are typically less than 40 mV.

The slicer-latch 102 is conventional and can be implemented in a variety of circuit topologies and typically implemented in an integrated circuit. A slicer-latch is for purposes here a circuit that samples an input signal in response to a clock signal (not shown) and quantizes the signal to a binary "+1" or "−1" based on the sampled analog input signal and a slicer threshold setting, $s_t$. If the input to the slicer 102 at time k is $y_k$, then the detected data bit output, $â_k$ of the slicer 102 is given as follows:

$$â_k = +1 \text{ if } y_k > s_1$$
$$= -1 \text{ otherwise.}$$

In a typical application of the slicer-latch and when receiving data, the slicer-latch has a slicer threshold setting $s_t$ of zero. In other embodiments, the binary representations of the quantized signal could be reversed, the slicer threshold setting $s_t$ could be nonzero, or the output bits have values of "1" and "0". In other embodiments, the slicer threshold setting $s_t$ is a known value or voltage, e.g., +200 mV. In still other embodiments, the threshold setting is a current instead of a voltage and the input signals applied to the slicer-latch might be currents instead of voltages.

In the embodiment shown in FIG. 1, the slicer-latch 102 has multiple inputs. When used in a serial-deserializer receiver, the slicer-latch 102 receives an input signal on input 104 and feedback signals on input(s) 106. Input 108 is used to receive an offset cancellation signal (voltage) to cancel any offset voltage in the slicer-latch 102. This offset cancellation voltage comes from a digital-to-analog converter (DAC) 110 in response to a codeword from a processor or finite-state-machine 112.

Inputs 104 and 108 can be coupled to a common voltage with a known value, e.g. 700 mV, by the processor 112 configuring switches 114, 116 to decouple connect inputs 104 and 106, respectively, from signals and instead couple the inputs to the common voltage. In this embodiment, inputs 104 and 106 are differential inputs each having complementary inputs (e.g., positive and negative inputs) that are all coupled by switches 114, 116 to the common voltage so that the differential voltage applied to the inputs 104 and 106 is essentially zero volts during calibration. As used herein with differential input embodiments, the threshold voltage of the slicer-latch refers to the differential signal applied to the inputs thereof to cause the output of the slicer-latch to transition. It is understood that non-differential implementations of the slicer-latch 102 can be calibrated using the techniques described herein.

As is typically done in the prior art to calibrate the slicer-latch 102, the processor 112 configures the switches 114, 116 to force a common voltage signal on the inputs 104 and 106. Then the processor, responsive to the output 120 of the slicer-latch 102, changes or sweeps the offset cancelation voltage from DAC 110 from one voltage limit to a second voltage limit by incrementing or decrementing a codeword applied to the DAC 110 until the output 120 changes or transitions state. The processor 112 then "fixes" or holds the voltage from the DAC 110 by "freezing" or stopping the codeword at the level it was when the transition in the output 120 occurs. However, this technique might result in an incorrect offset voltage due to noise that might be induced into the DAC 110 and on the signal on input 108.

Figure 2:
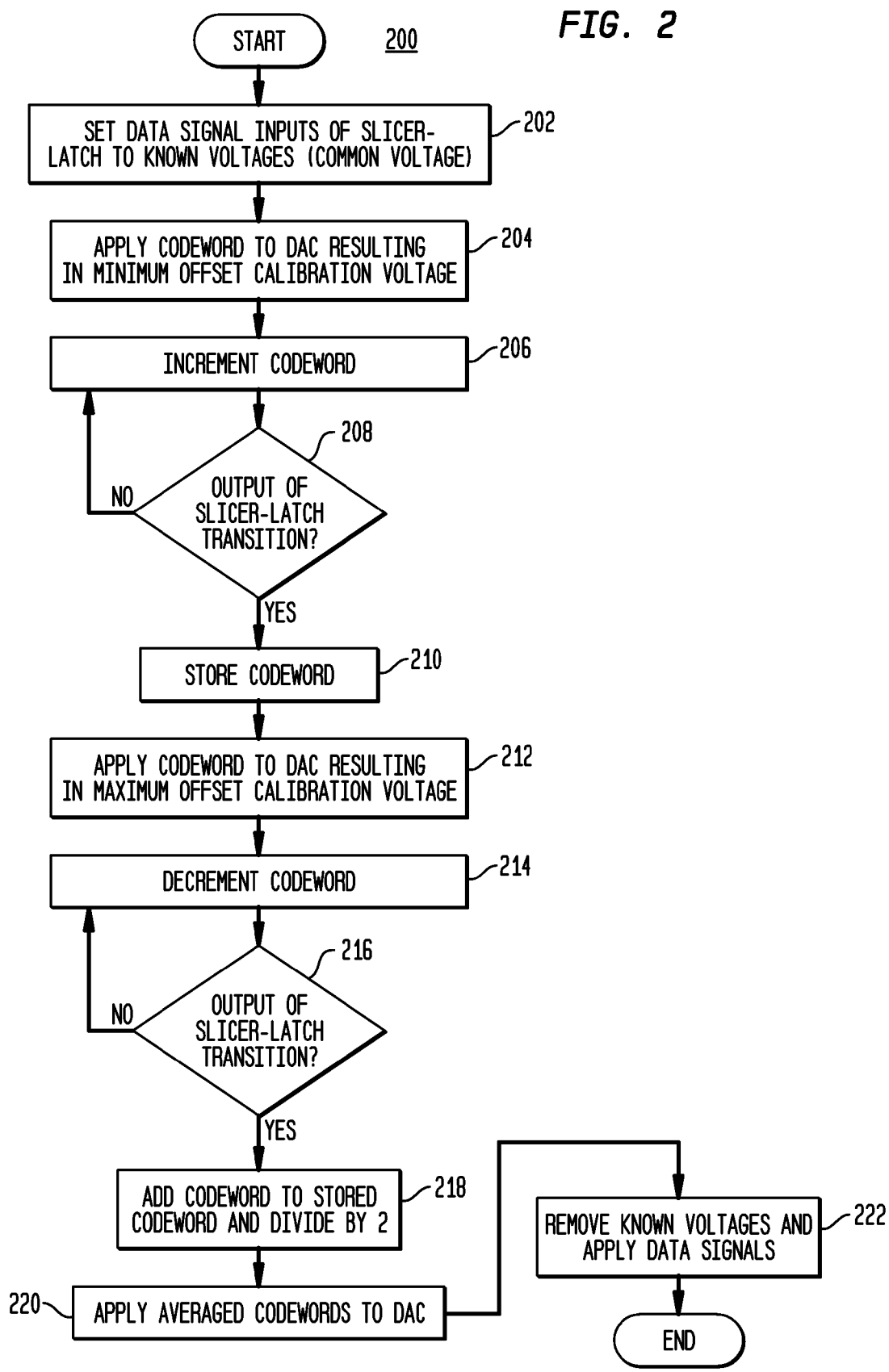
FIG. 2 is a flowchart of an exemplary process for calibrating the slicer-latch shown in FIG. 1.

In FIG. 2 and in accordance with one embodiment, an exemplary process 200 for calibrating the slicer-latch 102 as executed by the processor 112 is shown. Beginning with step 202, the processor 112 configures switches 114, 116 to couple a known voltage to the signal inputs 104, 106 of the slicer-latch 102. Next, in step 204, the processor generates a codeword to DAC 110 so that the DAC outputs a minimum offset calibration voltage and applies it to input 108. Then the processor 112 increments the codeword in step 206 and in step 208 the processor checks the output 120 of the slicer-latch 102 to determine if the output has switched state by detecting a transition (e.g., going from a zero to a one or vice versa). If no transition occurred, then steps 206 and 208 are repeated until a transition is detected. Once a transition is detected, then in step 210 the codeword that resulted in the transition is stored for later use. Next, in step 212, the processor generates a codeword to DAC 110 so that the DAC outputs a maximum offset calibration voltage and applies it to input 108. Then the codeword decrements the codeword in step 214 and in step 216 the processor checks the output 120 of the slicer-latch 102 to determine if the output has switched state by detecting a transition. If no transition occurred, then steps 214 and 216 are repeated until a transition is detected. Once a transition is detected, then in step 218 the codeword that resulted in the transition detected in step 216 is averaged with the stored codeword from step 210 by adding the stored codeword to the codeword from step 216 and dividing the result by two. The averaged codeword is then applied to the DAC 102 in step 220 and the input signals and feedback signals are reapplied to the slicer-latch 102 in step 222. By determining a first codeword by increasing the offset calibration voltage and then determining a second codeword by decreasing the offset calibration voltage and averaging the codewords together address, any impact of nonlinearities in the DAC (e.g., unequal voltage steps for each change in the codeword), noise that might be present in the DAC and slicer-latch, and non-ideal sensitivity of the slicer-latch, that might otherwise corrupt the determination of the offset calibration voltage by prior art methods is reduced.

It is understood that the steps described above can be reordered. For example, steps 204, 206, 208 and steps 212, 214, 216 can be interchanged. In this way, the decrementing steps are done before the incrementing steps. The same results can be expected regardless of whether the incrementing or decrementing steps are done first or last. Moreover, the steps 204-218 can be repeated multiple times and the codewords from each repetition averaged together before executing step 220.

Figure 3:
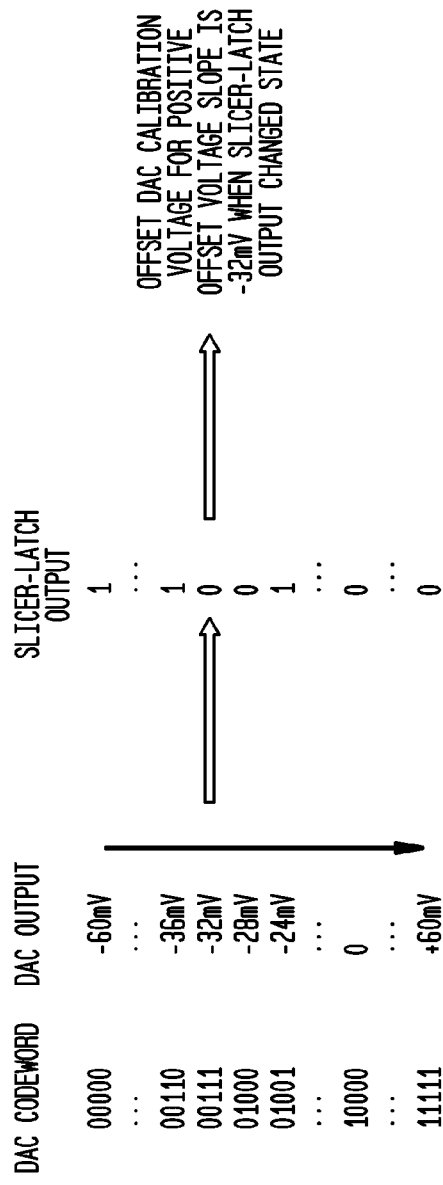
FIGS. 3 and 4 illustrate an example of calibrating the slicer-latch of FIG. 1 using the exemplary process of FIG. 2.
Figure 4:
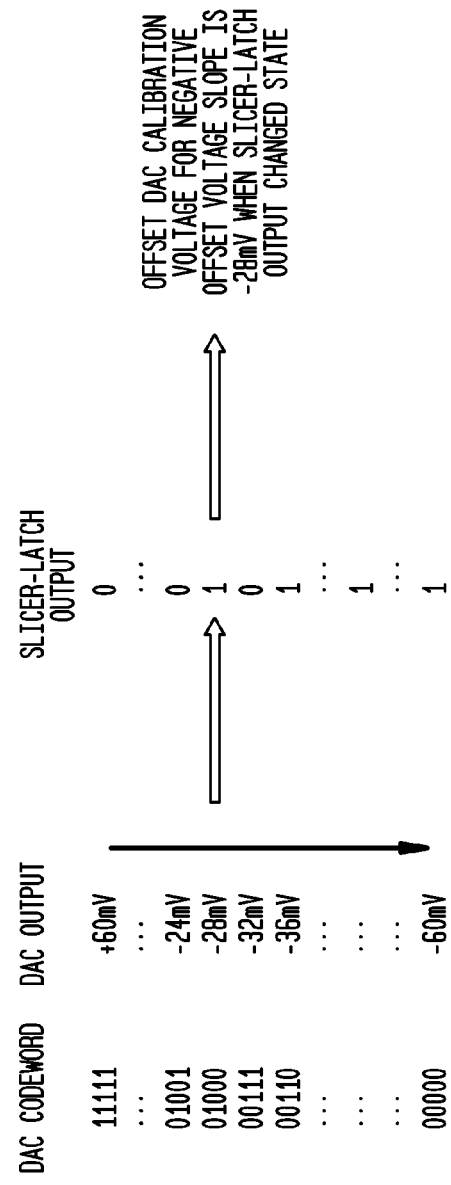

Operation of the above process is illustrated in FIGS. 3 and 4. In FIG. 3, the DAC codeword begins with all zeros, corresponding to a minimum DAC output voltage, here −60 mV. This exemplary voltage, when applied to the input 108 of the slicer-latch 102, guarantees a one from the slicer-latch 102. As the processor increments the codeword, the DAC output, here the offset calibration voltage to input 108 of the slicer-latch 102, increases in voltage as signified by the arrow, each increase in the DAC codeword increasing the output voltage by 4 mV. As the DAC output increases, the output 120 of the slicer-latch 102 changes from a one to a zero, signaling the processor 112 to stop incrementing the codeword. In this example, the transition in the output of slicer-latch 102 occurs when the DAC output voltage changes from −36 mV to −32 mV, making the codeword 00111 (corresponding to −32 mV) the offset calibration codeword for this part of the offset calibration process. Next, as shown in FIG. 4, the DAC codeword begins with all ones, corresponding to a maximum DAC output voltage, here +60 mV. Like the −60 mV discussed above, applying +60 mV to the input 108 guarantees a zero from the slicer-latch 102. As the processor decrements the codeword, the DAC output decreases in 4 mV steps as signified by the arrow. As the DAC output decreases, the output 120 of the slicer-latch 102 changes from a zero to a one, signaling the processor 112 to stop decrementing the codeword. In this example, the transition in the output of the slicer-latch 102 occurs when the DAC output voltage changes from −24 mV to −28 mV, making the codeword 01000 (corresponding to −28 mV) the offset calibration codeword for this part of the calibration process. Then, the two codewords are added together and divided by two, making the offset calibration voltage −30 mV. However, since the minimum step size is 4 mV, there is no DAC codeword corresponding to −30 mV. To address this, the averaging is done with any remainder ignored. In this example, using binary notation, the average is calculated as (00111 (−32 mV)+01000 (−28 mV))/2=01000 (−28 mV).

The starting values in steps 204 and 212 are chosen to be less than a minimum expected offset voltage and greater than a maximum expected offset voltage, respectively, (i.e., to exceed the expected offset voltage) to assure that the output of the slicer-latch 102 can be set to a known value over all manufacturing, temperature, and operating voltages of the slicer-latch. In the example used here, −60 mV and +60 mV was chosen to these voltages exceed the expected offset voltages by the slicer-latch. It is understood that these voltages are strictly exemplary and other voltages might be used as well.

Figure 5:
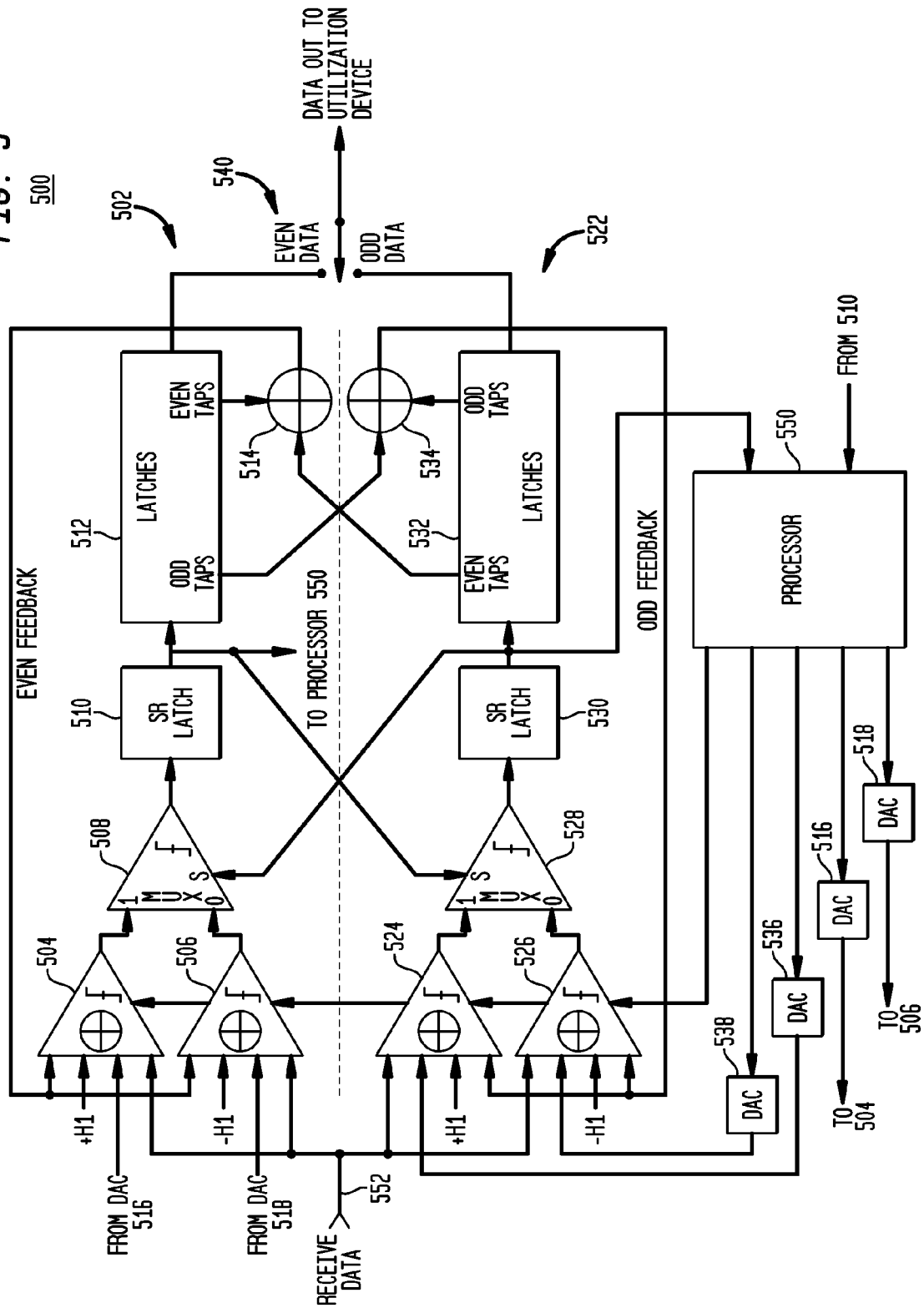
FIG. 5 is an exemplary receiver using the calibration system and multiple instantiations of the slicer-latch of FIG. 1.

Use of the slicer-latches 102 as part of a receiver is illustrated in FIG. 5. Here, a receiver 500, typically implemented in an integrated circuit, includes a half-rate unrolled digital feedback equalizer (DFE) and has two branches, an even branch 502 and an odd branch 522. Each branch has an upper slicer-latch 504, 524 and lower slicer latch 506, 526. These slicer-latches are substantially the same as the slicer-latch 102 in FIG. 1 including switches 114 and 116, although the functionality of these switches might be implemented elsewhere in the receiver 500 (e.g., in the input signal path 552 and in the summer, respectively). Outputs of the slicer-latches couple to corresponding multiplexer-latches 508, 528. Outputs of the multiplexer-latches couple to inputs of corresponding set-reset latches (SR latches) 510, 530. Outputs of the set-reset latches couple to inputs of corresponding serially-coupled latches 512, 532. Weighted even-order taps from the latches 512 and weighted even-order taps from latches 532 are summed by summer 514 and the sum passed back to slicer-latches 504, 506. Similarly, odd-order weighted taps from latches 512 and odd-order weighted taps from latches 532 are summed by summer 534 and the sum passed back to slicer-latches 524, 526. For each branch, which slicer-latch output is passed to a SR latch by the multiplexer-latch is determined by the output of the SR latch of the other branch. In this embodiment, the multiplexer select input S of multiplexer-latch 508 receives the output of the SR-latch 530, and the multiplexer select input S of multiplexer-latch 528 receives the output of the SR-latch 510. Thus, selection of which slicer-latch output is passed on to the SR latch in one branch is controlled by data passing through the other branch.

The latches in the receiver 500 are clocked by one of two complementary clock phases (not shown). Generally, sequential latches in each branch are clocked with a clock phase opposite that of the adjoining latches (i.e., a first latch is clocked with a first phase, the next latch clocked with the phase opposite the first phase, then the next latch clocked with the first phase, etc.) and corresponding latches between the two branches are clocked with opposite phase clocks (e.g., SR latch 510 is clocked with a clock having the opposite phase to the clock for SR latch 530).

One or more un-weighted taps from latches 512, 532 are coupled to switch 540. Switch 540, under the control of a clock (not shown) selects, depending on the state of the clock, data from either latches 512 or latches 532 to provide output data of the receiver.

Operation of the receiver 500 is known in the art and can be understood generally in "A 78 mW 11.1 Gb/s 5-Tap DFE Receiver with Digitally Calibrated Current-Integrating Summers in 65 nm CMOS" by J. F. Bulzacchelli et al., Paper 21.6 presented at the 2009 IEEE Solid-State Circuits Conference, February 2009, and "A 7.5 Gb/s 10-Tap DFE Receiver with First Tap Partial Response, Spectrally Gated Adaptation, and $2^{nd}$-Order Data-Filtered CDR" by B. S Leibowitz el al., Paper 12.4 presented at the 2007 IEEE Solid-State Circuits Conference, February 2007, both of which are incorporated herein by reference in their entirety.

A processor 550, in one embodiment a finite-state machine due to its simplicity, receives the outputs of the SR latches 510, 530, to perform a calibration process described below in connection with FIG. 6. The processor 550 controls DACs 516, 518, 536, and 538. Outputs from the DACs are coupled to corresponding inputs of the slicer-latches 504, 506, 524, and 526, respectively, to provide an offset calibration voltage thereto, each offset calibration voltage specific to that slicer-latch. Once the receiver 500 has been calibrated, the DACs maintain the offset calibration voltages at the same voltage during operation of the receiver until a new calibration is performed. The processor 550 might be used for other operations, e.g., tap weight adaptation by the DFE.

In addition to the calibration voltage and feedback from the corresponding summer as discussed above, each slicer-latch 504, 506, 524, 526 receives an input signal on input 552 and a weighted signal +/−H1. In this embodiment, H1 is a conventional tap weight generated by a DAC (not shown) in response to the processor 550 when the processor is used for tap weight adaptation by the DFE.

Processor 550 also controls the slicer-latches 504, 506, 524, 526 so that the inputs to the summer in each slicer-latch can be connected to a known voltage for calibration.

An exemplary calibration process for the slicer-latches in the receiver 500 is shown in FIG. 6. The calibration process 600 employs the calibration process for individual slicer-latches shown in FIG. 2. Generally, the slicer-latches in the even branch 502 are calibrated first, then the slicer-latches in the odd branch 522 are calibrated but it is understood that the odd branch slicer-latches can be calibrated before the even branch slicer-latches. In each branch, one (e.g. lower) slicer-latch is calibrated then the other (e.g., higher) slicer-latch calibrated. Selection of which of the slicer-latches to be calibrated in a branch is by configuring the multiplexer therein to couple the output of the slicer-latch to be calibrated to an output accessed by the processor 550. By having the DACs coupled to slicer-latches in the other branch forcing the outputs of those slicer-latches to have the same known logic state, the configuration of the multiplexer is determined by the codeword applied to the DACs and thus under control of the processor 550 without adding additional logic circuitry to the receiver 500 to configure the multiplexer-latches.

Beginning with step 602, the received data signal is removed and an input signal having a known voltage, e.g., a common voltage is applied to the receiver 500. Next, in step 604, the DACs 536, 538 are forced by the processor 550 to output a calibration voltage to the slicer-latches 524, 526 so that both slicer-latches output a zero (e.g., by applying the codeword=11111 to DACs 536, 538). This configures the multiplexer in multiplexer-latch 508 to receive the output of the slicer-latch 506. Next, in step 606, the calibration routine 200 is executed to calibrate the lower slicer-latch 506. Then in step 608 the DACs 536, 538 are forced by the processor 550 to output a calibration voltage to the slicer-latches 524, 526 so that both slicer-latches output a one (i.e., by applying the codeword=00000 to DACs 536, 538). This configures the multiplexer in 508 to receive the output of slicer-latch 504 so that in step 610, when the calibration routine 200 is executed, the upper slicer-latch 504 is calibrated. The result is the slicer-latches in the even branch 502 are now calibrated.

Calibration of the slicer-latches in the odd branch 522 is similar to that described above for the even branch 502. However, before beginning the calibration of the odd branch 522, in step 612 the codewords for DACs 516 and 518 as determined in steps 606 and 610 are temporarily stored until needed in step 622. Beginning with step 614, the DACs 516, 518 are forced by the processor 550 to output a calibration voltage to the slicer-latches 504, 506 so that the slicer-latches output a zero (e.g., by applying the codeword=11111 to DACs 516, 518). This configures the multiplexer in multiplexer-latch 528 to receive the output of the slicer-latch 526. Next, in step 616, the calibration routine 200 is executed to calibrate the lower slicer-latch 526. Then in step 618 the DACs 516, 518 are forced by the processor 550 to output a calibration voltage to the slicer-latches 504, 506 so that the slicer-latches output a one (i.e., by applying the codeword=00000 to DACs 516, 518). This configures the multiplexer in 528 to receive the output of slicer-latch 524 so that in step 620, when the calibration routine 200 is executed, the upper slicer-latch 524 is calibrated. The result is the slicer-latches in the odd branch 522 are now calibrated. In step 622, the stored codewords for DACs 516 and 518 are retrieved and applied to the corresponding DACs, completing the calibration of receiver 500, and the received data signal is applied to the receiver 500.

It is understood that not all the steps or portions of the steps in the calibration routine 200 needs to be executed in each of the steps 606, 610, 616, and 620. For example, step 222 in FIG. 2 might be skipped when additional multiple slicer-latches are to be calibrated or other steps, e.g. step 622, performs this step at least in part.

While embodiments have been described with respect to circuit functions, the embodiments of the present invention are not so limited. Possible implementations, either as a stand-alone SERDES or as a SERDES embedded with other circuit functions, may be embodied in or part of a single integrated circuit, a multi-chip module, a single card, system-on-a-chip, or a multi-card circuit pack, etc. but are not limited thereto. As would be apparent to one skilled in the art, the various embodiments might also be implemented as part of a larger system. Such embodiments might be employed in conjunction with, for example, a digital signal processor, microcontroller, field-programmable gate array, application-specific integrated circuit, or general-purpose computer. It is understood that embodiments of the invention are not limited to the described embodiments, and that various other embodiments within the scope of the following claims will be apparent to those skilled in the art.

It is understood that various changes in the details, materials, and arrangements of the parts which have been described and illustrated in order to explain the nature of this invention may be made by those skilled in the art without departing from the scope of the invention as expressed in the following claims.

The invention claimed is:

1. A method of reducing offset errors in a data slicer having at least two analog inputs and a digital output, the method comprising the steps of:
   a) applying a fixed signal to a first one of the data slicer inputs, the fixed signal having a known value;
   b) applying a calibration signal to a second one of the data slicer inputs, the calibration signal having a value;
   c) setting the value of the calibration signal to a first starting value;
   d) changing the first starting value of the calibration signal by an amount having a first polarity;
   e) repeating step d) until an output of the slicer-latch changes state;
   f) storing the changed value of the calibration signal as a first value;
   g) setting the value of the calibration signal to a second starting value different from the first starting value;
   h) changing the second starting value of the calibration signal by a second amount having a second polarity opposite the first polarity;
   i) repeating step h) until the output of the data slicer changes state;
   j) averaging the changed value of the second starting value of the calibration signal with the first value to form a calibration signal average value;
   k) applying the calibration signal average as the calibration signal to the second one of the data slicer input;
   l) removing the fixed signal from the first one of the data slicer input; and
   m) applying an input signal to the first one of the data slicer input.

2. The method of claim 1 wherein the values are voltages.

3. The method of claim 2 wherein the first data slicer input is a differential input.

4. The method of claim 2 wherein the first and second starting values are less than a known value and greater than the known value, respectively.

5. The method of claim 4 wherein the data slicer has a minimum expected offset voltage and a maximum expected offset voltage and the first starting value is less than the minimum expected offset voltage and second starting value is greater than the maximum expected offset voltage.

6. The method of claim 1 wherein the calibration signal is generated by a digital-to-analog converter responsive to a codeword having a quantity, the first and second amounts being a change in the quantity of the codeword.

7. The method of claim 6 wherein the first and second amounts are the same amount, and the first and second starting values are less than and greater than a known value, respectively.

8. The method of claim 7 wherein a processor, responsive to the output of the data slicer, provides the codeword to the digital-to-analog converter, and in step d) the processor increments the codeword and in step h) the processor decrements the codeword.

9. The method of claim 8 wherein the first and second values are first and second voltages, respectively, provided by the digital-to-analog converter when the processor provides a first or second codeword to the digital-to-analog converter to provide the respective first or second voltages.

10. The method of claim 9 wherein in step c), the processor provides the first codeword to the digital-to-analog converter, in steps d) and e) the processor increments the first codeword until the change is detected by the processor in the output of the data slicer, in step f) the incremented first codeword is stored in a memory, in step g) the processor provides the second codeword to the digital-to-analog converter, in steps h) and i) the processor decrements the second codeword until the change is detected by the processor in the output of the data slicer, and in step j) incremented first codeword and the decremented second codeword are summed and divided by two to generate a calibration codeword that is applied to the digital-to-analog converter in step k).

11. The method of claim 8 wherein the data slicer, processor, and digital-to-analog converter are implemented in integrated circuit technology.

12. The method of claim 11 wherein the data slicer, processor, and digital-to-analog converter are implemented in a single integrated circuit.

13. A receiver having:
at least one data slicer having at least two analog inputs and an output;
a processor responsive to an output of the data slicer;
a digital to analog converter responsive to a codeword from the processor and having an output coupled to one of the analog inputs of the data slicer;
wherein the processor is configured to:
  a) apply a fixed voltage to one of the data slicer inputs, the fixed voltage having a known value;
  b) apply a calibration voltage from the digital-to-analog converter to a second one of the two data slicer inputs;
  c) set the calibration voltage to a first starting voltage;
  d) change the first starting voltage of the calibration voltage by an first amount having a first polarity;
  e) repeat step d) until the output of the data slicer changes state;
  f) store the changed voltage of the calibration voltage as a first voltage value;
  g) set the calibration voltage to a second starting voltage different from the first starting voltage;
  h) change the second starting voltage of the calibration voltage by a second amount having a second polarity opposite the first polarity;
  i) repeat step h) until the output of the data slicer changes state;
  j) average the changed voltage of the calibration voltage from step i) with the first voltage value to form a calibration signal average voltage;
  k) apply the calibration signal average voltage as the calibration signal to the second data slicer input;
  l) remove the fixed voltage from the first data slicer input; and
  m) apply an input signal to the first data slicer input.

14. The receiver of claim 13 wherein the codeword has a quantity proportional to the calibration voltage, and the first and second amounts are a change in the quantity of the codeword.

15. The receiver of claim 14 wherein in step d) the processor increments the codeword and in step h) the processor decrements the codeword.

16. The receiver of claim 15 wherein the first and second starting voltages are provided by the digital-to-analog converter to the data slicer when the processor provides a first or second codeword to the digital-to-analog converter to provide the respective first or second starting voltages in steps c) and g), respectively.

17. The receiver of claim 16 wherein in step c), the processor provides the first codeword to the digital-to-analog converter, in steps d) and e) the processor increments the first codeword until the change is detected by the processor in the output of the data slicer, in step f) the incremented first codeword is stored in a memory, in step g) the processor provides the second codeword to the digital-to-analog converter, in steps h) and i) the processor decrements the second codeword until the change is detected by the processor in the output of the data slicer, and in step j) incremented first codeword and the decremented second codeword are summed and divided by two to generate a calibration codeword that is applied to the digital-to-analog converter in step k).

18. The receiver of claim 13 wherein the first and second starting voltages are less than a known voltage and greater than the known voltage, respectively.

19. The receiver of claim 13 wherein the data slicer has a minimum expected offset voltage and a maximum expected offset voltage and the first starting voltage is less than the minimum tolerance voltage and second starting voltage is greater than the tolerance voltage.

20. The receiver of claim 13 wherein the receiver further comprises a decision feedback equalizer responsive to the at least one data slicer and having adjustable taps, the processor being further configured to control values of the taps.

21. The receiver of claim 13 wherein the receiver is implemented in integrated circuit technology.

22. The receiver of claim 21 wherein the receiver is implemented in a single integrated circuit.

\* \* \* \* \*